Oct. 4, 1938.　　　W. B. DEAN　　　2,132,001
RAIL CAR TRUCK
Filed Aug. 20, 1934　　　5 Sheets-Sheet 1

INVENTOR.
WALTER B. DEAN.
BY
John P. Tarbox
ATTORNEY.

Oct. 4, 1938.    W. B. DEAN    2,132,001
RAIL CAR TRUCK
Filed Aug. 20, 1934    5 Sheets-Sheet 2

INVENTOR.
WALTER B. DEAN.
BY
John P. Fairbox
ATTORNEY.

Oct. 4, 1938.        W. B. DEAN        2,132,001
RAIL CAR TRUCK
Filed Aug. 20, 1934        5 Sheets-Sheet 3

INVENTOR.
WALTER B. DEAN
BY
John P. Tarbox
ATTORNEY.

Oct. 4, 1938.    W. B. DEAN    2,132,001
RAIL CAR TRUCK
Filed Aug. 20, 1934    5 Sheets-Sheet 4

INVENTOR.
WALTER B. DEAN.
BY
John P. Fasbox
ATTORNEY.

Oct. 4, 1938. W. B. DEAN 2,132,001
RAIL CAR TRUCK
Filed Aug. 20, 1934 5 Sheets-Sheet 5

INVENTOR.
WALTER B. DEAN.
BY
John P. Tarbox
ATTORNEY.

Patented Oct. 4, 1938

2,132,001

UNITED STATES PATENT OFFICE 2,132,001

RAIL CAR TRUCK

Walter B. Dean, Narberth, Pa., assignor to Edward G. Budd Manufacturing Company, Philadelphia, Pa., a corporation of Pennsylvania Application August 20, 1934, Serial No. 740,557

18 Claims. (Cl. 105—190)

The invention relates to a rail car truck and more particularly to a motor driven truck adapted for use in connection with articulated trains.

It is among the objects of the invention to provide a truck of this class in which the frame is characterized by simplicity, lightness, sturdiness and compactness of construction and provided with a very low center of gravity. A further object of the invention is to provide very effective cushioning means throughout the whole truck construction to deaden the noises and to effectively cushion the various shocks to which parts of the truck are subjected in use. A further object is the provision of adequate safety devices to ensure against serious damage to the truck, the cars supported thereon, or the passengers in the event of failure of the parts which may be subject under prolonged wear and severe conditions of use to failure.

These objects, and others which will become apparent from the following detailed description, are attained by designing the truck frame with vertically deep, rectilinear generally I-section side frames and transoms interconnecting the side frames, this design permitting the truck frame to be generally built up of flat plate stock arc welded together. This construction permits the top and bottom chords of the I-section forming the side frames and transoms to be fabricated out of a single Π form plate when viewed in plan, which plate can be provided in the corners with generous fillets to adequately take the stresses in this region. The welding may thus be confined to places of low stress or pure shear. By this construction, the joints are made in substantially all cases by building up on both sides of the web so as to provide a strong filleted joint. Extreme lightness is attained by this construction particularly when high tensile alloy steels are used as is contemplated, such, for example, as chrome-manganese steel. Such a steel when annealed has a tensile strength of the order of 85,000 lbs. per sq. inch permitting the use of plates the heaviest of which are of the order of ¾″ in thickness and the lightest of which are of the order of ¼″ in thickness.

Sturdiness and strength are further attained by welding auxiliary reinforcing ribs to the I-section main frame members wherever extraordinary strains are placed on them. Such reinforcements add little to the weight in comparison with the added strength which they supply.

Not only is the frame proper so constructed generally of flat plates arc welded together, but the bolster and the spring plank may likewise be of this light but strong fabricated construction.

The cushioning and deadening is attained by a generous use of rubber cushions in the pedestal liners, in the side and center bearings between the bolster and car bodies and between the bolster and transoms and in various other regions.

Compactness is further attained by disposing the motor between the axle and transom and supporting it from the transom in a manner to avoid placing undue stress upon the mounting. This is accomplished by having the motor support secured to the top and bottom of the transom in what amounts to virtually a three point support.

Full strength of the transoms is obtained by having swing hangers extend down between the transoms and the bolster, and the mounting of the swing hangers on the transom is such as to avoid drop of the swing hanger in the case of failure of its supporting pin on the transom.

A further safety feature is the provision of a limit drop device between the gear casing and its support which prevents drop of the gear casing in the event of failure of the support.

Other and further objects and the manner in which they are attained will become apparent from the following detailed description when read in connection with the drawings forming a part of this specification.

In the drawings,

Figures 5, 6 and 7 are detailed sectional views taken respectively on the lines indicated by the corresponding numbers on Figure 1.

Figure 1:
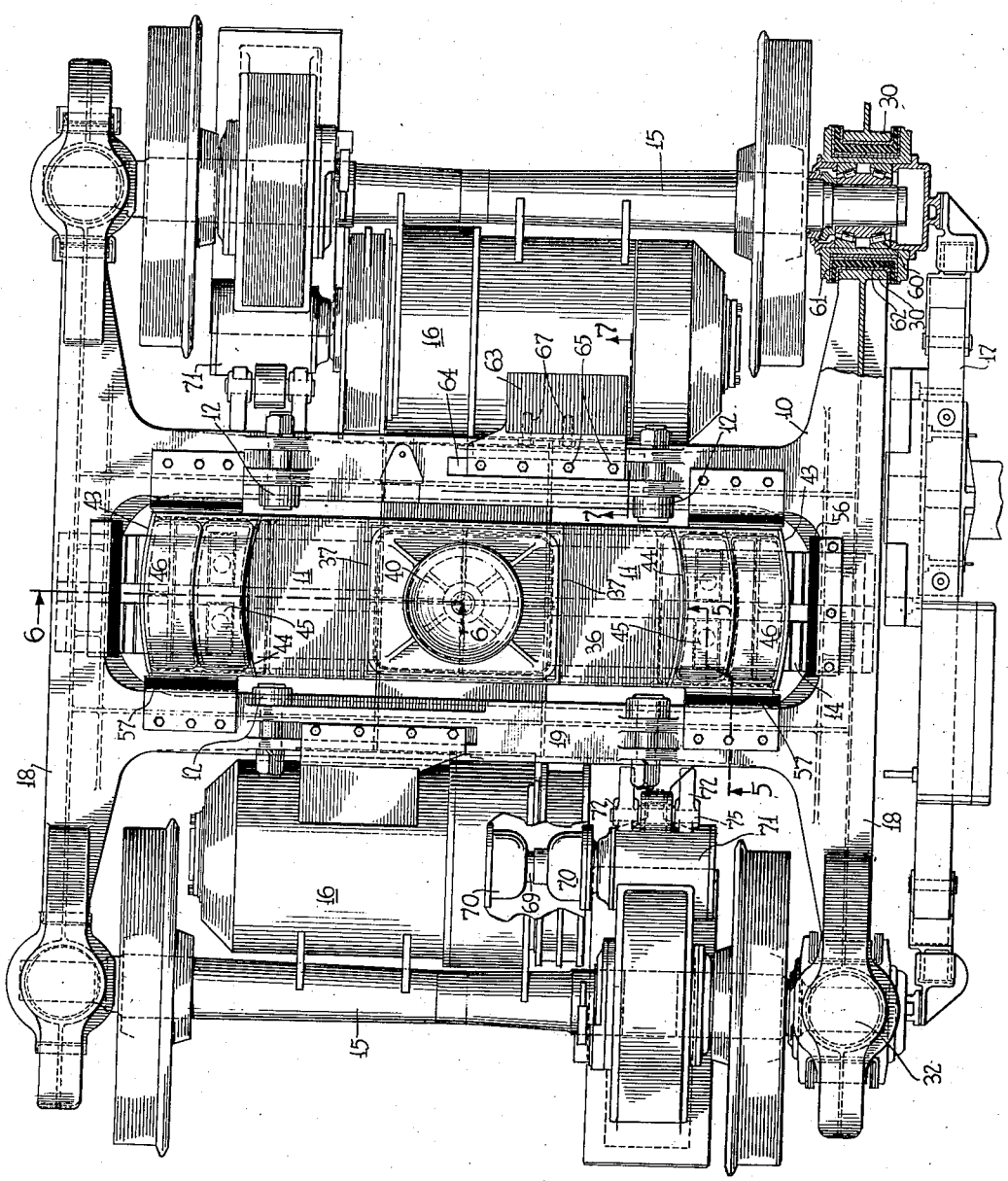
Figure 1 is a plan view, parts being shown in section, of a truck embodying the invention.
Figure 2:
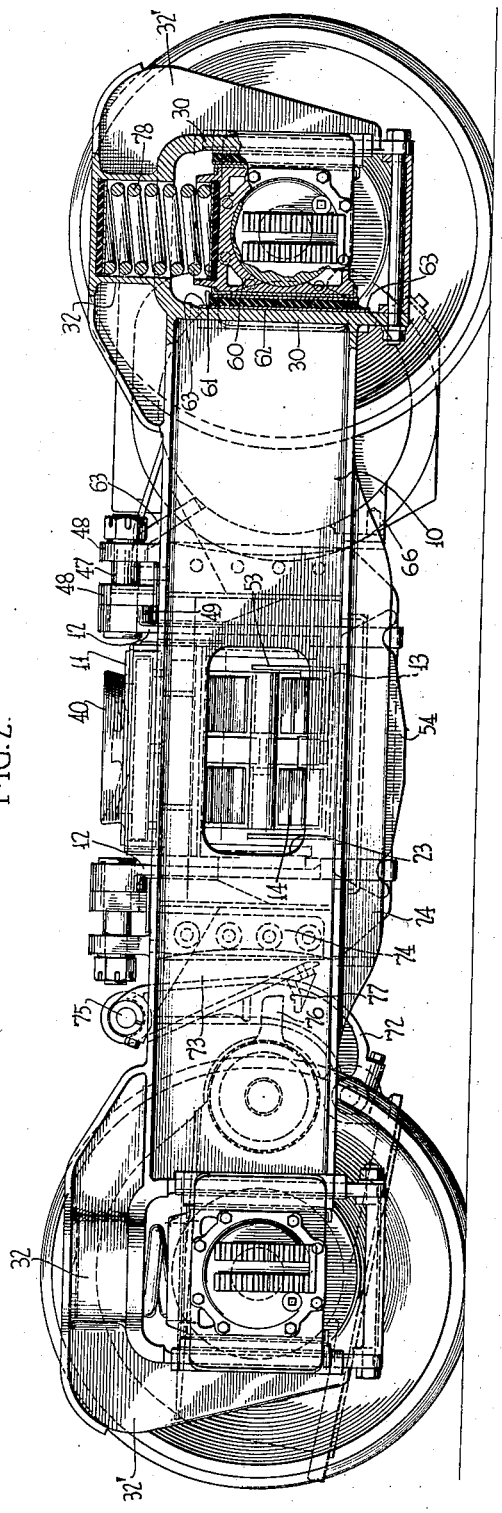
Figure 2 is a side elevational view thereof, parts being shown in section.
Figure 3:
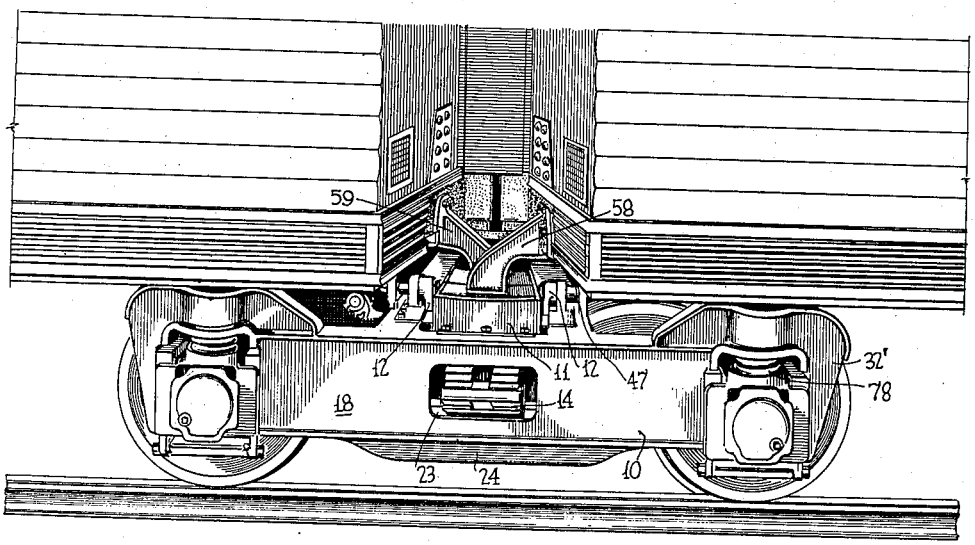
Figure 3 is a perspective view looking down upon the top of the truck and showing fragmentary end portions of two articulated cars supported by the truck.
Figure 4:
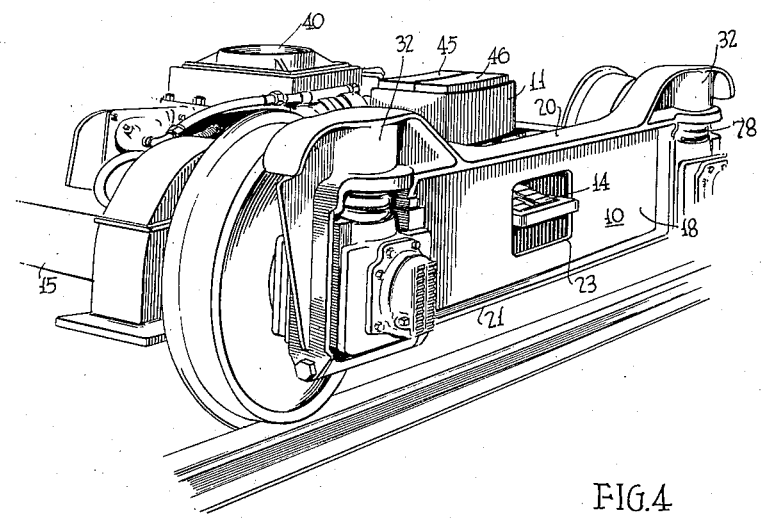
Figure 4 is a fragmentary perspective view of one side of the truck as seen from the rear and looking down upon the truck.
Figure 8:
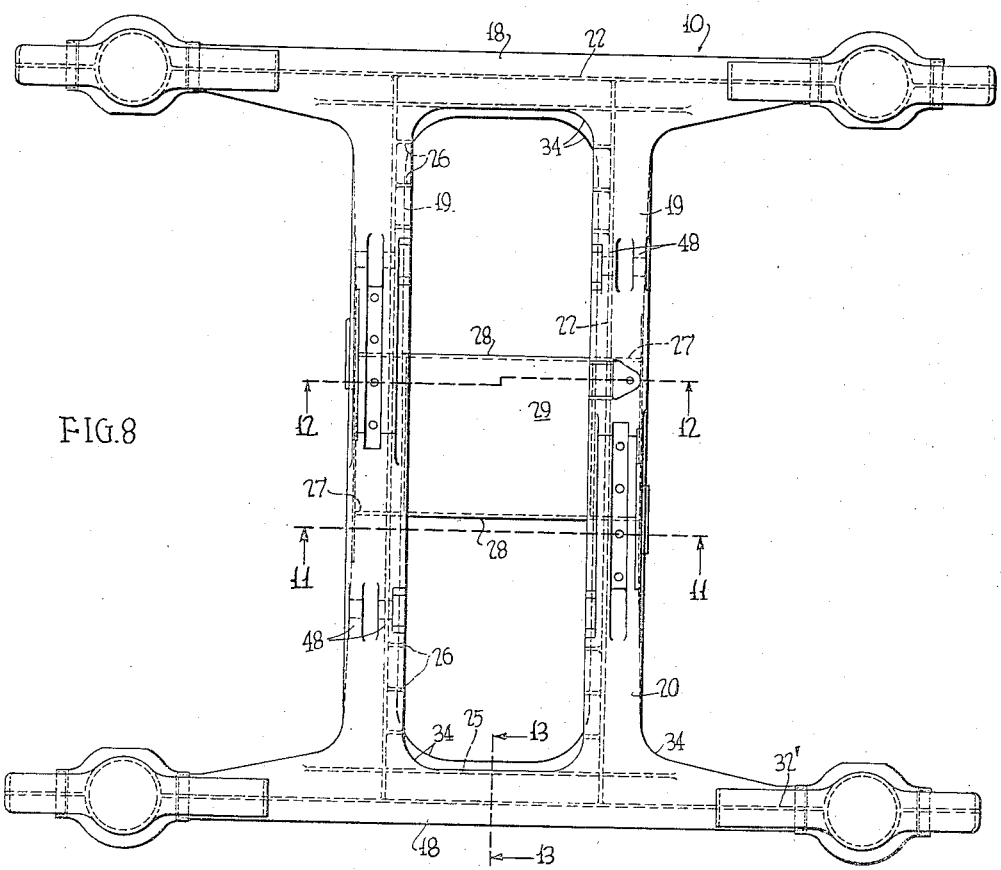
Figures 8 and 9 are respectively a plan view and a side elevational view of the truck frame per se.

Referring to Figures 1 to 4 of the drawings, the truck frame is generally indicated by 10, the bolster by 11, the swing hangers supporting the bolster by 12, the spring plank by 13, the bolster supporting springs by 14, the axles supporting the truck by 15, the motors driving the axles by 16 and collector shoe supporting beam by 17.

As most clearly appears in Figures 8 to 15 inclusive, the truck frame comprises essentially the side frames 18 and the spaced transoms 19 interconnecting the side frames and forming with the side frames a substantially H form figure in plan. The members of this frame are generally of I-form in cross section as appears clearly from the sectional views of Figures 11, 12 and 13 of great vertical depth, and of substantially rectilinear form. This construction provides a frame well adapted to receive most of the truck accessories within the vertical height of the frame and provides a truck construction having a very low center of gravity and of a strength and rigidity well adapted to take the shocks to which it is subjected.

To facilitate its fabrication out of relatively light gauge flat plates, the upper and lower chords 20 and 21 of the I-section are each preferably formed out of a single flat plate extending through a major portion of the side frames and the whole length of the transoms and of generally H form in plan. These chords are interconnected by the deep vertical web plates 22 which are arc welded to the chords on both sides in accordance with the typical joint shown in the enlarged view of Figure 15 to provide a strong filleted connection. The ends of the webs of the transoms are similarly joined to the webs of the side frames.

The webs of the side frames are formed centrally with the openings 23 to provide clearance for the projecting ends of the bolster springs 14.
These openings somewhat weaken the strength of the I-section beam in this region, and to compensate for this and perhaps to add to such original strength, each of the side frames 18 is reinforced in this region by a shallow downwardly projecting web plate 24 (see Figures 9 and 13) which is arc welded to the bottom chord 21 and extends some distance beyond each end of the opening 23. The side frames 18 may be additionally reinforced in this central region by shallow web plates 25 arc welded to the top chords 20 and extended some distance beyond the vertical webs 22 of the transoms. The transoms 19 are additionally reinforced at places of greatest strain by shallow vertical webs 26 (see Figs. 8 and 10) extending inwardly from the webs 22 of the transoms and welded thereto and to the top chords 20 and also by vertical webs, as 27 extending outwardly from the webs 22 of the transoms, and similarly arc welded thereto and to the top and bottom chords. In the same longitudinal plane as webs 27, the transoms are interconnected by shallow vertical webs 28 arc welded to the bottom chords 21 thereof. These webs from the bottom chords of the transoms are additionally interbraced by a shallow U-section plate 29, Figs. 11 and 12, the side walls of which are arc welded to the inner edges of the bottom chords 21 and the end walls of which are welded to the tops of the webs 28 which conform to the channel section in this region.

Figure 9:
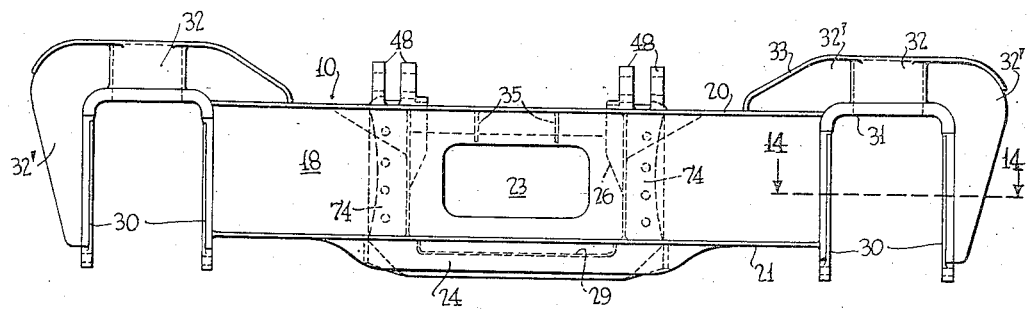
Figure 10:
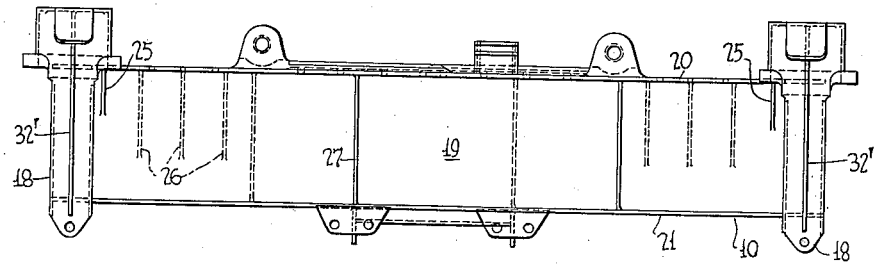
Figure 10 is an end elevational view of the truck frame as seen from the right in Figure 8.
Figure 11:
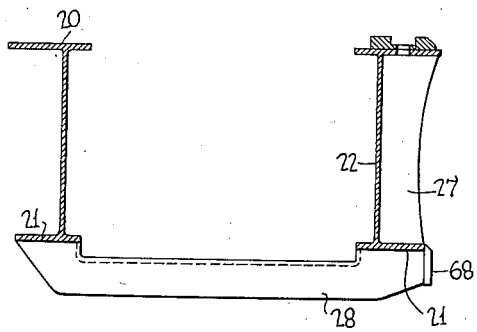
Figures 11, 12, 13 and 14 are respectively detailed sectional views taken on the lines indicated by corresponding numerals on Figures 8 and 9.
Figure 12:
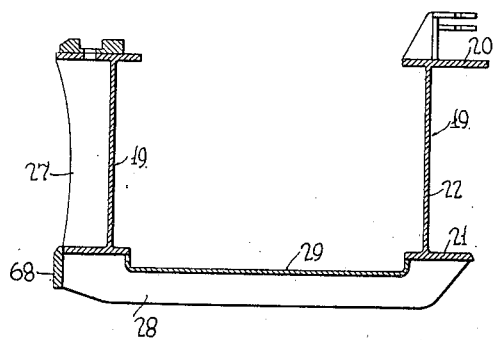
Figure 13:
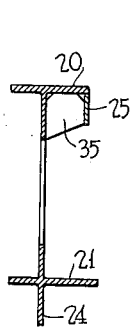
Figure 14:
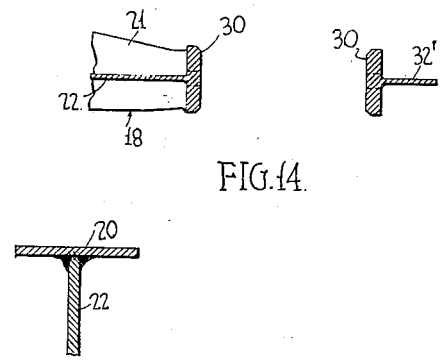
Figure 15:
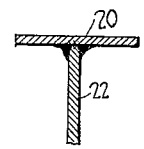
Figure 15 is a detail view on an enlarged scale of a typical arc welded joint used substantially throughout the truck frame construction.

At their ends the side frames are extended by downwardly opening U-section pedestals 30 which are arc welded on their inner sides to the side frames 18 as clearly appears in Figures 9 and 14.
The top walls of the pedestals are pierced by openings 31 to the margins of which, and extending upwardly therefrom, are secured the spring barrels 32. The joinder between the pedestals and the I-section main body portions of the side frames is further reinforced by a vertical web plate 32' arc welded to the central portion of the top chord 20 and extending over the top of the pedestal and down its outer side, being secured thereto throughout in a manner similar to the manner already described. This web is also secured to the spring barrel 32 to strengthen and reinforce same. The entire structure is further reinforced at this point by a cover plate 33 which is arc welded at its end to the top chord 20 and extends out over the spring barrel to the outer side of the pedestal and forms with the web 32' a T-section reinforce uniting the end portion of the side frames, pedestal and spring barrel and strongly reinforcing the entire structure in this region.

By forming the top and bottom chords 20 and 21 of the frame out of a single plate, the strength of the parent metal is present throughout and by reason of the fact that generous fillets 34 are provided where the transom sections merge into the side frame sections, the strength of the entire structure is materially increased. The reinforcing web plates 25 are located in the end margins of the central opening adapted to receive the bolster and form the lateral abutments against which the ends of the bolster may swing. To brace them against the shocks occasioned by this arrangement, they may be reinforced by shallow vertical webs 35 (see Figures 9 and 13) welded thereto and to the top chords 20 and webs 22 of the side frame members.

The swinging bolster 11 is fabricated in a manner similar to the frame structure out of flat plates arc welded together and comprises a main horizontal flat plate 36 (see Figures 1 and 6) which is centrally reinforced by upwardly and downwardly extending webs 37 and 38 extending transversely of the plate and also along the edges of the plate on the opposite sides thereof. The upwardly extending web 37 forms a recess or pocket to receive a rubber buffer 39 and a central bearing plate 40 which telescopes within the pocket or recess. The central reinforcing plates 37 thus have a double function of reinforcing the central portion of the bolster and providing a recess to receive the cushioned center bearing by which the ends of two adjacent cars are articulated to the truck, see Fig. 3.

Adjacent its ends the bolster plate 36 is reinforced at the bottom by spaced downwardly extending webs 41 which form with lateral webs 46' a pocket to receive a rubber cushion 42 to cushion the bolster spring 14. At its end margins, the bolster plate 36 is further reinforced by a vertical web 43 extending above and below plate 36. This end portion of the bolster is curved, as clearly appears in Figure 1, and some distance inwardly of the end a similarly curved upwardly extending web 44 is secured. These curved webs 43 and 44 form with edge webs secured to the lateral margins of the plate 36 between the webs 43 and 44 upwardly facing pockets which receive the rubber cushioned bearings 45 and 46 adapted to cooperate with the side bearings of the adjacent articulated cars as will presently be described. At its lateral margins the bolster plate 36 is further reinforced by vertically extending webs 46', see Figs. 2, 5, and 6, giving the bolster as a whole a downwardly facing channel-section.

The bolster is of a width somewhat less than the space between the transoms 19, as clearly appears in Figure 1, leaving a space between each side of the bolster and its adjacent transom. These spaces are of a width sufficient to admit extending the swing hangers 12 supporting the bolster down between the bolster and the adjacent transom, thereby avoiding the necessity of cutting into the transom or bolster to accommodate the swing hangers. Each swing hanger is supported from the top of the adjacent transom from a pin 47, itself supported in spaced brackets 48 secured to the top of the transom. The inner one of said brackets 48 is spaced from the inner side wall of the transom, and the swing hanger is provided with an outwardly extending boss 49 which directly overlies a seat on top of the transom, this seat being of a width longitudinally of the truck substantially in excess of the lost motion between the body of the swing hanger and the space through which it extends. Thus there is provided a safety feature in connection with the bolster suspension which positively prevents the dropping of the swing hanger down into the space between the bolster and the adjacent transom in the event of failure of the pin 47. Should such pin fail, the only thing that could happen would be for the boss 49 of the swing hanger to drop down in engagement with the seat adapted to receive it. Since the vertical spacing of the boss from this seat is but a very small one, such drop would be without appreciable shock.

The swing hangers are supported from the transoms inwardly from the ends of the transoms a distance sufficient to leave spaces laterally for the installation of track brakes upon the trucks, should such installation be desirable. The swing hangers extend downwardly and outwardly to their engagement with the spring plank 13 from which the bolster is in turn supported by the springs 14.

The spring plank, like the bolster, is fabricated of a main flat plate body portion 50 reinforced centrally, adjacent its ends where the swing hangers are connected to it, and along its sides, respectively, by upwardly extending webs 51, 52 and 53, the side webs 53 giving the spring plank, in effect, an upwardly facing channel section. A knife edge bearing bar 54 extends between the swing hangers pivoted from the opposed transoms, and this knife edge bearing bar cooperates with the V-shaped bearing 55 secured to the bottom of the spring plank adjacent each end thereof. According to the present invention the spring plank has been extended some distance laterally beyond the knife edge bearing and, in this extended portion, is provided with a seat 55, to receive the bolster spring 14. This outward extension of the spring plank permits a greater spacing of the spring seats supporting the opposite ends of the bolster, and hence gives to the bolster and to the car ends supported thereby a greater lateral stability.

As has already been pointed out, the improved truck construction is provided very generously with rubber buffers wherever desirable, a few of these having already been mentioned in connection with the description of the bolster construction. In addition to those already mentioned, rubber buffers 56 (see Figure 6) are provided to cushion the end movement of the bolster and similarly, rubber cushioned end bearings 57 are provided between the opposite ends of the bolster and the adjacent transoms, these cushioned bearings normally serving to keep the bolster centered with relation to the space between the transoms and further serving to cushion the shocks between the bolster and transoms in the direction of movement.

Similarly, the cushioned side bearings 45 and 46, adjacent the ends of the bolster, normally engage the side bearings 58 and 59 of the adjacent car ends (see Figure 3) and serve to maintain the car ends in laterally balanced relation. Thus the rubber cushions under the side bearings, while tending normally to prevent tilting of the car ends and at all times yieldably opposing such tilting, do not prevent such relative tilting between the ends of the car on the truck where the conditions of operation as in rounding a curve on the track, require it. By providing such a cushioned engagement between the side bearings of the car and the side bearings of the bolster, the usual space between the side bearings of the bolster and car to allow for such necessary tilt is not present, and consequently the noises and shocks occasioned by the sudden engagement of the side bearings of the car with the side bearings of the truck are eliminated.

To still further add to the quiet operation of the truck and to take up the shock between the axle and the pedestals in all directions, there is provided a novel form of pedestal liner between the pedestal 30 and the axle bearing 60 (see Figures 1 and 2) sliding in the pedestal. This pedestal liner may be assembled as a unit prior to its assembly in the truck and comprises a U-shaped wear plate 61 and a smaller U-section mounting plate 62 and a U-shaped rubber filler between the side and bottom walls of the plates which is secured thereto in any suitable manner, preferably by vulcanizing, to form a unitary liner. To secure the liner in position the ends of the mounting plate 62 are extended at 63, see Figure 2, beyond the ends of the liner, and these extended portions are securely attached to the pedestals by any suitable securing means. In order to have the rubber of the liner take substantially all the load in compression, the spaces between the side walls of the plates 61 and 62 is of less depth than the space between the bottom walls so that the rubber between the bottom walls will not be unduly placed in shear and also to provide sufficient rubber between the bottom walls to take the heavy shocks directed longitudinally in compression.

This mounting of the axle and the pedestals not only diminishes the track noises which are ordinarily transmitted from the wheels through the truck frame into the car but at the same time provides effective shock absorbing means to minimize the pounding usually present between the pedestal and the axle support.

According to the invention, each axle 15 is driven by a separate electric motor 16, the motor being disposed between the axle and the adjacent transom and supported entirely from the transom. As shown in Figures 1 and 7, a triangular section plate bracket 163 is arc welded to the motor casing and has one end hooked over the shouldered seat 64 secured to the top transom. The securement of the motor supporting bracket 163 to the transom is through a relatively long overlap between the bracket and the transom and a secure fastening by bolts 65. At the bottom, the motor housing has secured to it a relatively narrow bracket 66 located midway between the ends of the top bracket 163 and bolted by two bolts 67 to a vertical web 68 extending between and welded to the vertical webs 28 (see Figures 7, 11 and 12). This wide top support for the motor combined with the narrow bottom support, gives to the motor, in effect, a three point support from the transom which minimizes the strain placed upon the motor support due to any slight twisting movement of the transom.

The motor drives the axle through shaft 69, universal joints 70 and a pinion, not shown, driving a gear also not shown, secured directly to the axle. The pinion and gear just referred to are housed within the gear casing 71 which is supported at one end from the axle and at the other end by a pair of links 72 from a bracket 73 secured to a vertical web 74 (see Figs. 2 and 9) on the transom. The support of the links from this bracket is through pin 75 which carries the torque load of the drive from the motor. Here again a safety device is provided to prevent drop of the gear casing into engagement with the track in the event of failure of the pin 75 for any reason as, for example, after the pin has become worn. Such means comprise a nose or projection 76 from the end of the gear casing which lies directly above a hooked projection 77 on the bracket 73. In the event of the failure of the pin 75, the projection 76 engages the projection 77 and limits the drop of the casing thereby avoiding possible damage.

The double elliptical springs 14 for supporting the truck bolster from the spring plank and also the coil springs 78 reacting between the pedestal and the axle bearing are both provided with rubber cushion abutments which soften the action of these springs and by lessening the metal to metal contact, assist in eliminating noises which originally are caused by direct metal to metal engagement.

While by way of illustration and example I have described my invention in connection with a preferred embodiment thereof as to structure, and the preferred manner of practicing it, it will be obvious to those skilled in the art, after understanding the foregoing specification, that various changes and modifications may be made without departing from the spirit or scope of the invention and I aim in the appended claims to cover all such modifications and changes.

What I claim is:

1. A truck frame having side frames and transoms, said side frames and transoms including a one piece horizontal flange member and vertical web members, said frame being fabricated substantially throughout of flat plates arc welded together at their places of joinder by a double row of arc welds.

2. A truck frame having side frames and transoms of generally I-section, the webs forming the I-section being fabricated out of substantially flat plate stock arc welded together, all of said webs being arc welded to a common plate forming a chord member the I-section being reinforced in locations where additional strength is required by auxiliary vertical plates arc welded to the members of the I-section.

3. A truck frame having side frames and transoms of generally I-section, having top and bottom chords, one of the chords of said section being formed of a unitary plate of II form when viewed in plan.

4. A truck frame having side frames and transoms of generally I-section having top and bottom chords, one of the chords of said section being formed of a flat plate of II form in plan, the corners of which plate are provided with generous fillets.

5. A truck frame having a rectilinear side frame of substantially I-section, the web of the I-section being centrally perforated and a vertical reinforcing web extending the side frame below the lower chord of the I-section, said reinforcement extending from a point beyond one side of said perforation to a point beyond the other.

6. A truck frame having side frames and substantially rectilinear transoms interconnecting the side frame, the transoms being of generally I-section reinforced centrally by vertical webs extending below the bottom chords of the I-section and interconnecting the transoms and a channel plate connected at its ends to said vertical webs and through its side walls to the bottom chords of the transoms.

7. A truck frame having rectilinear side frames of vertically deep plate section provided at their opposite ends with downwardly facing U-section pedestals, horizontal chord members at the top and bottom of said side frames and arc welded thereto, the top walls of said pedestals being perforated and extended upwardly around said perforations by spring barrels and a vertical plate arc welded to the tops of the chord members adjacent the pedestals, to the top and outer side of the pedestal and to the vertically extending spring barrels, a portion of said vertical plate having a transverse portion to form a T section reenforcement over the open pedestal.

8. A welded truck frame including deep plate side frames and transoms, a pair of axles supporting said frames, an electric motor arranged between one of said transoms and the adjacent axle and means for supporting said motor from said transom, said means comprising a wide support securing the top of the motor to the top of the transom and a relatively narrow support securing the bottom of the motor to the lower portion of the transom, thereby providing, in effect, a three point suspension for the motor.

9. A welded truck frame including deep plate side frames and transoms, a spring plank between the transoms, a pair of axles supporting said frame, electric motors arranged between the transoms and the respective axle, and means for supporting said motors from said transoms, said means including relatively wide supports at the top of the motors and relatively narrow supports at the bottom of the motors, and a longitudinal reenforcing plate integrally secured to the respective transoms adjacent the bottom motor supports and adapted to transmit and balance stresses from and between the respective motors, said plate serving as the safety member under the truck spring plank.

10. A truck frame having side frames and transoms fabricated out of flat plates including vertical web members, said members being arc welded together on opposite sides thereof, and a horizontal flange member common to said web members and arc welded thereto on opposite sides thereof to form generally T-sections therewith.

11. A truck having side frames and transoms of generally rectilinear form and of generally I-cross-section, the webs of which are one-piece plates arc welded together on opposite sides thereof, the horizontal portion of the frame comprising a one-piece plate commonly welded to the web plates on opposite sides thereof, and additional plates arc welded to the webs to complete the I-cross section.

12. A truck frame having frames and transoms connecting the side frames, said side frames and transoms including plates of generally rectilinear form and vertically deep section and a separate one-piece horizontal chord member to which both the side frame and transom plates are secured, said frame and transom plates being arc welded on opposite sides to the chord members to provide strengthening fillets on both sides of the joint.

13. A truck frame having vertically deep plate side frames and vertically deep plate spaced transoms interconnecting the side frames, a chord member welded to and reinforcing the top edge of said side frames and transoms, and a bolster between said transoms and a plurality of swinging supports for said bolster, said supports extending to the top of said transoms along the side of the transoms and being supported on the top of the transoms.

14. A truck frame having side frames having end pedestal structures and transoms fabricated substantially throughout of flat plates arc welded together on opposite sides at their places of joinder, certain of said plates being substantially vertical and constituting web members and transverse substantially horizontal flanges for said webs, certain of said flanges being a portion of a one-piece plate commonly secured to the side frame and transom webs and extending to the pedestal structures.

15. A truck frame having side frames having end pedestal structures and transoms each of which includes a web portion fabricated out of substantially flat plate stock, said web portions being arc welded together, said truck frame also including a plate extending to the pedestal structures and common to said web portions and arc welded thereto on opposite sides to form a common flange, and means to reinforce the web portions including auxiliary vertical plates arc welded thereto.

16. A truck frame having longitudinally extending side frame webs, spaced, transversely extending, transom webs welded to the side frame webs, and chord members for said webs, one of said chord members being a flat plate of Π-form when viewed in plan and being integrally secured to the respective webs by welding.

17. A truck frame having side frame webs and transom webs and a chord for said webs consisting of a flat plate of Π-form in plan, the corners of such plate being provided with generous fillets, said chord being substantially coextensive with the side frame and transom webs and being secured thereto by welding.

18. A car truck frame including side members having pedestals at their ends and a plurality of transverse members disposed below the upper plane of said side members and constituting transoms; each of said members being built up of plate sections arc welded together on opposite sides thereof and having substantially an I-beam cross-section; a portion of each of said side members being in the form of a unitary plate continuous with a portion of each of said transoms and extending to the pedestals.

WALTER B. DEAN.